(12) United States Patent
Kelly et al.

(10) Patent No.: US 8,301,887 B2
(45) Date of Patent: Oct. 30, 2012

(54) METHOD AND SYSTEM FOR AUTOMATED AUTHENTICATION OF A DEVICE TO A MANAGEMENT NODE OF A COMPUTER NETWORK

(75) Inventors: Thomas J. Kelly, Fergus (CA); Samuel H. McLane, Blue Bell, PA (US); Ronald Frederick, Mountain View, CA (US); Dharmendra Mohan, Sunnyvale, CA (US); Darrell G. Long, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 774 days.

(21) Appl. No.: 12/023,441

(22) Filed: Jan. 31, 2008

(65) Prior Publication Data
US 2008/0209216 A1      Aug. 28, 2008

Related U.S. Application Data

(63) Continuation-in-part of application No. 11/242,213, filed on Sep. 30, 2005, now Pat. No. 7,802,092.

(51) Int. Cl.
*H04L 9/32* (2006.01)

(52) U.S. Cl. ........................................ 713/169; 713/171

(58) Field of Classification Search ................... 713/169, 713/171
See application file for complete search history.

(56) References Cited

U.S. PATENT DOCUMENTS

| | | | |
|---|---|---|---|
| 7,546,462 B2* | 6/2009 | Upton | 713/170 |
| 7,720,864 B1* | 5/2010 | Muth et al. | 707/785 |
| 2004/0143746 A1* | 7/2004 | Ligeti et al. | 713/185 |
| 2006/0015742 A1* | 1/2006 | Camaisa et al. | 713/182 |
| 2006/0161974 A1* | 7/2006 | Innes et al. | 726/10 |
| 2007/0002899 A1* | 1/2007 | Raman et al. | 370/469 |
| 2008/0271131 A1* | 10/2008 | Moore | 726/9 |
| 2009/0024746 A1* | 1/2009 | Welch | 709/228 |
| 2010/0138908 A1* | 6/2010 | Vennelakanti et al. | 726/11 |

* cited by examiner

*Primary Examiner* — Kambiz Zand
*Assistant Examiner* — Teshome Hailu
(74) *Attorney, Agent, or Firm* — Tarek N. Fahmi

(57) ABSTRACT

A first computer-based device is authenticated at a second computer-based device communicatively coupled thereto through use of a unique identifier and an encrypted token, each received from the first device. Following the authentication, configuration information for the first device is sent from the second device to the first device and the first device is authorized to join a network that includes the second device. Further, permissions related to the network may be granted to the first device.

14 Claims, 2 Drawing Sheets

METHOD AND SYSTEM FOR AUTOMATED AUTHENTICATION OF A DEVICE TO A MANAGEMENT NODE OF A COMPUTER NETWORK

RELATED APPLICATIONS

This application is a Continuation-in-Part of U.S. patent application Ser. No. 11/242,213, filed 30 Sep. 2005, now U.S. Pat. No. 7,802,092 entitled "Method and System for Automatic Secure Delivery of Appliance Updates", which is assigned to the assignee of the present invention and incorporated by reference herein in its entirety.

FIELD OF THE INVENTION

The present invention relates to systems and methods for authentication of computer-based devices communicatively coupled to one another, for example via a network.

BACKGROUND

The use of computer systems and associated networks by which these systems are communicatively coupled to one another is ubiquitous. With the ever increasing use of such systems and networks, the need for security with respect to same has likewise increased. To meet this challenge, organizations that rely on complex computer systems and networks tend to employ sophisticated security systems to prevent unauthorized access to the computer systems and networks and important data and processes stored therein.

Despite these steps to prevent unauthorized access to information and systems, however, computer systems and their associated networks remain vulnerable. For example, some organizations do not employ in-house technicians to manage the organization's networks and systems; relying instead on outside vendors for such services. Hence, when upgrades, modifications or repairs to the network or its systems are required, third parties must be provided with sensitive information such as passwords in order to effect same. Even relatively simple tasks such as adding new devices to a network can thus expose the entire network and its associated systems, and, perhaps worse, the data stored thereon, to compromise. Indeed, even where in-house personnel are used to manage and maintain the organization's computer systems and networks, the unscrupulous acts of disgruntled employees that have access to passwords and similar access codes can wreak havoc with the very systems they are supposed to protect and the data stored therein.

Thus, there is a need for systems and methods that allow for maintenance or other enhancements or upgrades to computer systems and/or associated networks (such as the installation of new devices within the network) without exposing sensitive information such as passwords to humans.

SUMMARY OF THE INVENTION

In one embodiment the present invention provides for mutually authenticating a first device seeking to join a computer network and a management node for the computer network to one another through an exchange of identification information (e.g., unique identifiers and digital certificates). Upon successful mutual authentication, the management node provides configuration information to the first device. This configuration information may be used to prohibit access to said first device by computer systems other than the management node and/or to configure the device for operations within the network. Prior to mutually authenticating the first device and the management node to one another, the first device is provided with sufficient information to contact the management node. This may include a network address and a unique identifier (e.g., a serial number) for the management node. This information may be provided via a communication path other than the computer network, for example, a separate wireless network, a local configuration interface for the first device, or a memory device coupled to the first device.

As part of the exchange between the management node and the first device, authentication information (e.g., respective SSH public keys) for the management node and the first device may be shared. This allows the management node and the first device to later establish secure communication sessions for data exchanges between the management node and the first device. Further, the management node may update a previously established device record for the first device (e.g., which may be identified from among a number of device records using a unique identifier presented by the first device during the authentication process) based on information received from the first device following the successful mutual authentication.

In a further embodiment of the invention, as part of an automated authentication process, respective SSH public keys for a pair of computer-based devices, and information sufficient to subjugate one of the devices to administration by the other of the devices and to prohibit unauthorized access to the subjugated one of the devices are exchanged. The automated authentication process includes an exchange of digital certificates between the devices.

Other features and embodiments of the present invention will be apparent from the accompanying drawings and from the detailed description which follows.

BRIEF DESCRIPTION OF THE FIGURES

The present invention is illustrated by way of example, and not limitation, in the figures of the accompanying drawings, in which.

DETAILED DESCRIPTION

Figure 1:
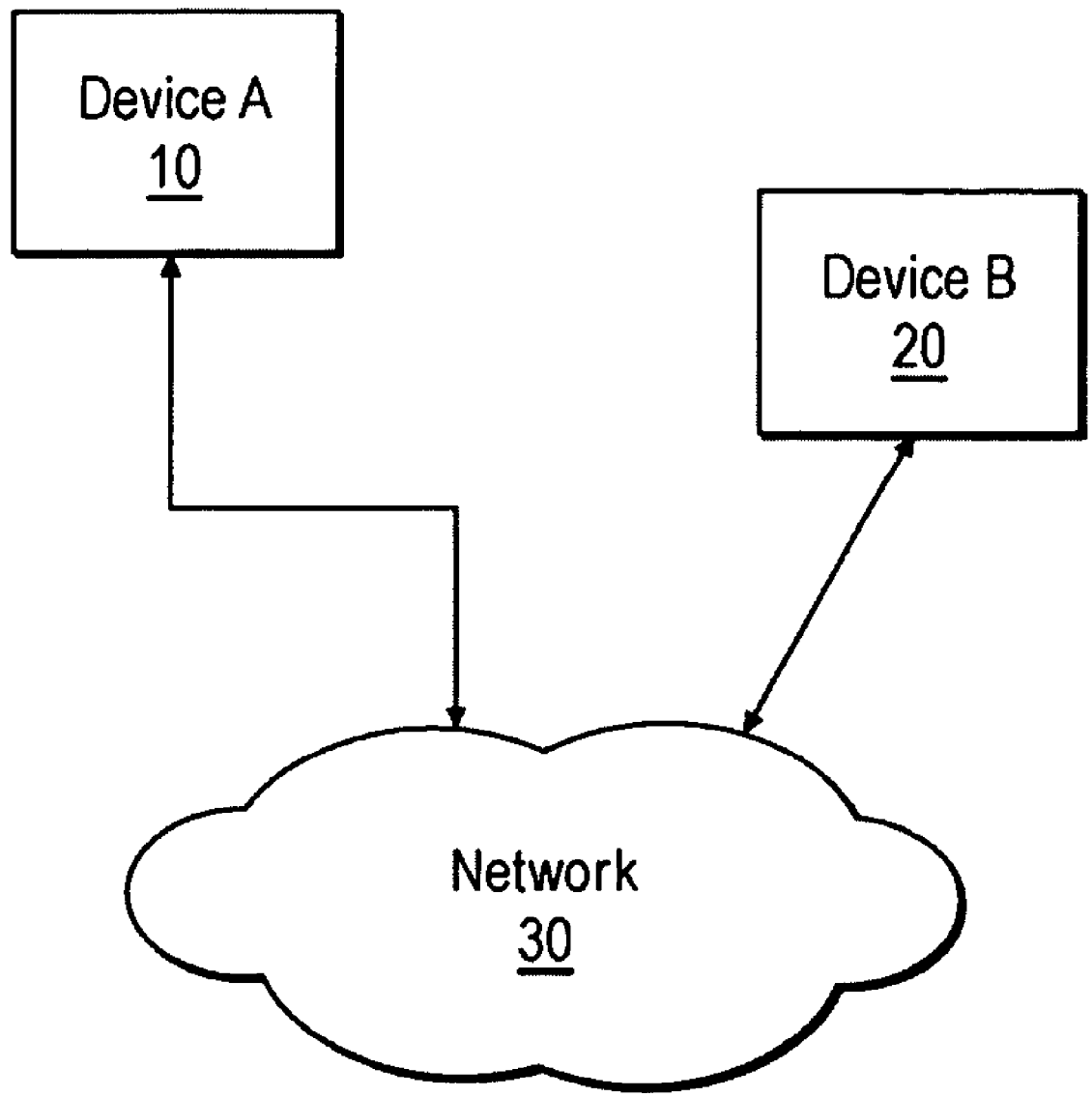
FIG. 1 illustrates an example of a network environment within which automated authentication methods that are embodiments of the present invention may be utilized.

Described herein are systems and methods for automatically authenticating a computer-based device to a management node within a network, without exposing passwords or other access or authentication information to humans during installation of such devices. Although these systems and methods will be discussed with reference to certain illustrated examples, these examples are not intended to limit the scope of the present invention. Instead, the scope of the invention should be measured only in terms of the claims following this description.

As will become evident from the discussion below, various embodiments of the present invention may be implemented with the aid of computer-implemented processes or methods (a.k.a. programs or routines) that may be rendered in any computer language and executed by any form of computer system. For convenience, the term "device" will be used herein to refer to such computer systems. A device may be specially constructed for its intended purpose, or it may be a general-purpose computer system selectively programmed to perform such functions. In any event, its specific construction and/or function within a network is not critical to the present invention. Thus, the processes presented herein are not inherently related to any particular network, computer system or other apparatus.

When network administrators are required to reconfigure a network by adding one or more computer systems thereto, the task is complicated by the need to properly authenticate the new devices within the context of the other components of the network. In conventional networks, this often requires the use of shared secrets (i.e., information elements known only to properly authenticated devices on a network) that must be securely communicated to each computer system. But such security instruments can be difficult to use properly and their compromise can lead to catastrophic security breaches. Moreover, the use of shared secrets can be burdensome inasmuch as every device on the network must be updated in the event of any compromise or simply periodically as part of a security audit or the like.

The present invention provides means by which a device being added to a network may receive assurances that it is communicating with an authorized management node for the network and then authenticate itself to that management node. Likewise, the management node, which is generally tasked with administration and/or configuration of one or more other devices within the network, is provided assurances that it is communicating with an authorized device. The present authentication processes may be completely automated and run without exposing any authentication credentials, passwords or other network access information to humans. This is useful because it minimizes the risk of compromise of the network, its systems and the data stored therein. Further, the present invention also provides for an exchange of authentication credentials (SSH keys in one instance) for later use in establishing secure connections between the management node and the device being added to the network (e.g., for an exchange of configuration information, etc.).

Referring now to FIG. 1, an example of a network environment in which the methods of the present invention may be implemented is shown. In this simplified network configuration two devices, device A 10 and device B 20, are communicatively coupled to one another through a network 30. Of course, other arrangements for these devices and any intervening networks are possible and in some instances device A may access the network 30 through device B. Further, as indicated above, devices A and B may be any form of computer system. For example, device A may be a server to be added to a network and device B may be an administrator device within the existing network. Or, device A may be a personal computer or an appliance being installed in a network. The network 30 may be any form of computer network, wired and/or wireless, wide area or local area; and may, in some instances, include networks of networks, such as the Internet. That is, the network 30 may, at least in part, be a private network overlaid on one or more public networks. The precise configuration of the network or computer systems therein is not critical to the present invention. For purposes of discussion herein, it will be assumed that device B is a management node for network 30 (and therefore controls which devices have access to the network) and that device A is being added to that network.

In order to better appreciate the present authentication methods, some discussion of digital certificates and digital signatures is useful. Whereas handwritten signatures are associated with paper documents, increasingly today electronic signatures are used in the context of electronic documents (e.g., e-mail messages, contracts, etc.). Electronic signatures can be any symbol or process associated with a document that a person intends to adopt as his/her signature. Digital signatures are a special kind of electronic signature that employ cryptogtraphic devices in order to assure a recipient of a document's (and here an e-mail message or other forms of electronic messages may be regarded as a form of document) integrity and authenticity.

In order to provide the assurance of authenticity, digital signatures make use of two separate but related cryptographic keys (called a key pair). One of these keys—called a public key—is made freely available to anyone, while the second key—the private key—is known only to the entity with which it is associated. An entity's public key is tied to that entity by a digital certificate issued by a certificate authority—a trusted issuer of such certificates—thus allowing the public key to be used as a means of identification.

For example, if a sender wants to send an authenticated message, he can sign the message using his private key and the recipient can then use the associated public key to verify the signature. The "signature" in this case is usually an encrypted form of a hash or digest of the original message; such encryption having been done using the sender's private key. At the receiving end, the recipient can compute a hash or digest of the received document and compare that computed hash with the one obtained by decrypting the signature using the public key of the entity that purportedly sent the document. If the two versions match, the signature is verified and the recipient can be certain that the message came from the sender associated with the public key. This scheme works because only the private key (which is known only to the sender) could have created the encrypted hash/digest that can be decrypted by its public key; hence, the document could not have been modified after the sender computed and encrypted the hash/digest.

Figure 2:
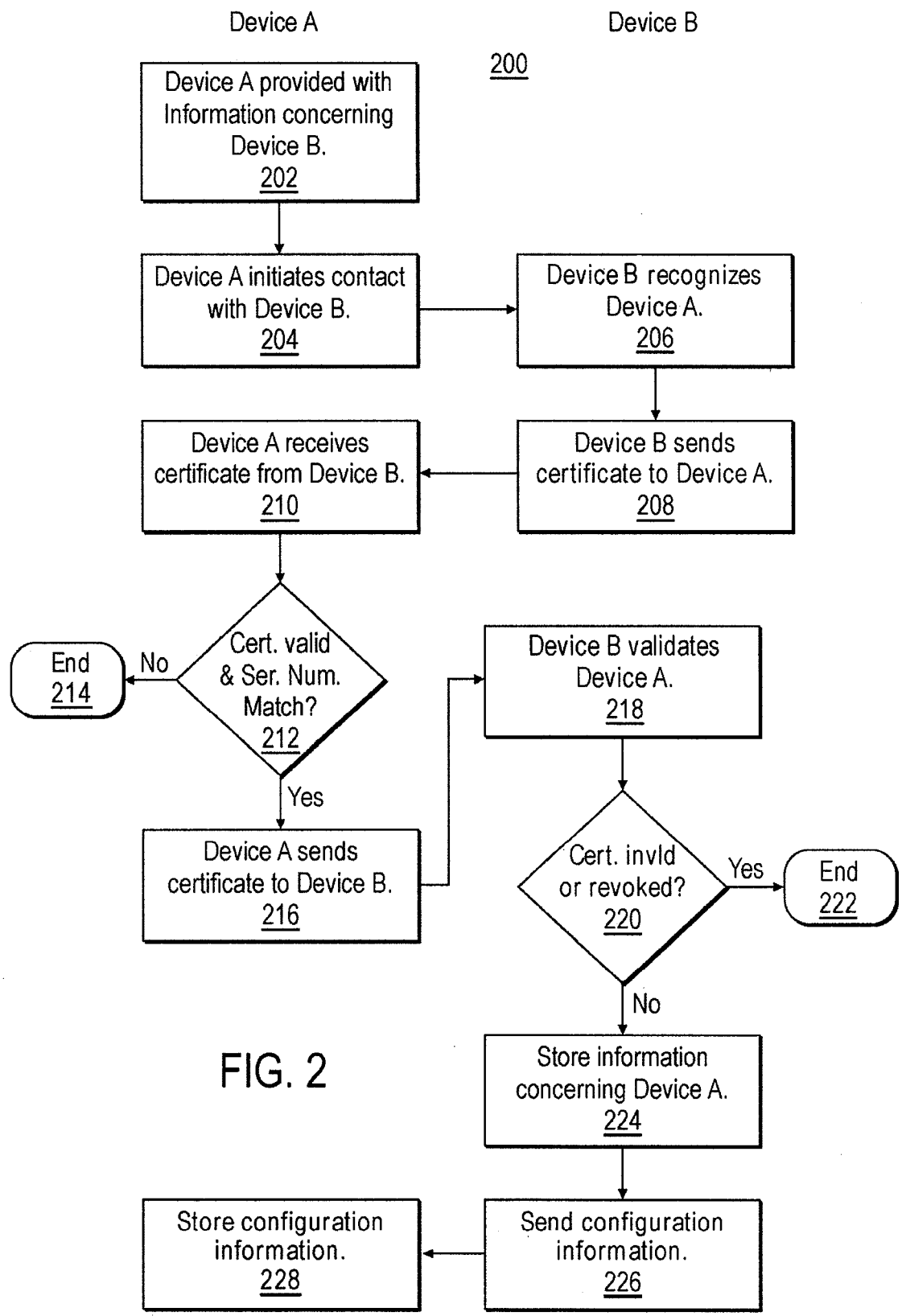
FIG. 2 is a flow chart depicting a method of automated authentication between devices in a computer network according to one embodiment of the present invention.

With the above background, we turn now to FIG. 2. Illustrated therein is a flow diagram of an authentication process 200 according to one embodiment of the present invention. Device A is a device to be added to a network and device B is a management node for the network. Method 200 begins with some basic information regarding device B being provided to device A (202). For example, device A will need some information concerning device B and how to contact it. This information may be provided locally by a person performing the installation of device A in the subject network, or remotely by a network administrator. In some cases, the information may be provided to device A prior to device A being installed in the network, while in other cases the information is provided as part of the installation process.

In one instance, device A is provided with a serial number or other identifier for device B and a network address for device B. Thus, when device A contacts what it believes to be device B at the stated network address, device B can present device A with its serial number (or other identifier). If the serial number (or other identifier) presented by device B matches that previously provided to device A, device A can be certain that it is communicating with the proper device B. To thwart man-in-the-middle attacks the serial number is presented within a digital certificate. After verifying the digital signature on the certificate, device A can know that it is in fact communicating with the actual device having the serial number in the certificate. At that point, device A compares the received serial number to the serial number it was expecting for device B, and if they match device A can be assured that it is communicating with the proper device.

As indicated above, the network address and serial number (or other identifier) for device B may be provided to device A prior to its physical connection to the network. For example, this information may be provided by a network administrator (e.g., by being stored in memory in device A) before device A is sent to an installer at a remote location from the network administrator. Or, this information may be provided at the time of physical connection to the network, for example by the installer through a local configuration interface or electronically via a portable memory device that can be attached to device A for such purposes. In the latter instance, the local installer may be prompted to connect the memory device to a designated port on device A when the information is needed. Thus, the information may be provided in a form that cannot be read by humans.

In still further embodiments, the information regarding device B may be provided from a remote source, via a wired or wireless communication path. For example, rather than a portable memory device, the local installer may provide device A with access to a wireless network via a mobile phone and initiate a computer-to-computer connection through that device which will allow device A to obtain the network address or other location information concerning device B from a computer system at the other end of the connection. Or, such a communication path may be used by a remote network administrator to gain access to device A's configuration interface and provide the information—thereby avoiding the need to provide same to the local installer.

Regardless of the process used to provide the network address and other information needed for device A to contact device B, once that information is provided, and once device A has been physically connected to the network (this may be a wireless or wired connection), device A will initiate communications with device B (204). Following any handshaking or other initialization routines (not shown in detail), device B will recognize that device A is a new device seeking access to the subject network (206). In response, device B presents device A with its identification information (e.g., its serial number) in the form of a signed digital certificate (208).

Upon receiving the digital certificate from device B (210), device A validates the signature and determines whether or not the serial number presented with the digital certificate matches the identification information provided to device A in step 202. (212). If this validation and identification process fails, the authentication procedure ends (214). This may be indicative of a situation where an unauthorized device is seeking to hijack device A.

Assuming device A accepts the information provided by device B, device A then sends its own digital certificate to device B (216). This certificate may have been previously stored in device A prior to the installation procedure (e.g., at its time of manufacture or at some point thereafter, prior to the network installation process). The certificate is signed by a trusted certificate authority so that when device B receives the certificate it can validate same using the public key of the certificate authority (218).

Optionally, device B may also consult a certificate revocation list (CRL) to ensure that the certificate received from device A has not been revoked. The CRL lists certificates that are no longer acceptable for authentication purposes. The list may be maintained by a network administrator or another individual with rights granted by the network administrator to modify the list. In one embodiment of die invention, the CRL is stored locally at device B (e.g., having been obtained when the certificate authority issued the digital certificate for device A) and may be periodically updated (e.g., by distributions from the certificate authority or other trusted source). Alternatively, the CRL may be stored remotely (e.g., at the certificate authority) and requested by device B at the time it needs to perform the check. Or, device B may issue a request to the certificate authority (or other repository where the CRL is maintained) for a determination of whether the certificate received from device A has or has not been revoked.

If the certificate presented by device A is invalid or if it has been revoked (220), the process quits (222) and device A is not permitted to access the network. Assuming, however, the certificate received from device A is valid and has not been revoked (and, optionally, if device B verifies that a unique identifier, such as a serial number, presented by device A is included in a list of authorized device serial numbers), device B stores (e.g., in a device record that is identified using the unique identifier information sent by device A) information concerning device A (such as configuration data) that is provided by device A during this authentication process (224). This information may include details of the location in which device A is installed, its physical configuration, and/or any other information relevant to the situation. Device B may then send configuration information to device A (226). This configuration information (which may be retrieved from the device record noted above) may include information concerning the network which device A is joining (e.g., a list of other devices which device A is authorized to communicate with and/or vice-versa), configuration information for the device, and/or authorization to join the network. Device A subsequently stores this configuration information for later use (228).

A variety of information may be passed between the two devices as part of the above-described authentication procedure. For example, device A may provide sufficient information to allow device B to register device A as an authorized node within the subject network. This may include a network address (e.g., an IP address), a unique identifier for device A (e.g., a serial number), device A's secure shell (SSH) host public key and TCP/IP port (SSH is a communication protocol for connecting remote computer systems over a TCP/IP network—it allows one computer to log into another computer, execute commands in that other computer, and/or move files from one system to another in a secure fashion), and a unique device name (if used). Device B may store this information as part of a record for device A for later use, for example when transferring new configuration information to device A and/or performing other administration of device A. In some cases, a network administrator may have previously established a device record for device A and stored same on device B (or in a database accessible to device B). If so, device B can use the information from device A to update or supplement this existing record. Otherwise, if no preexisting record exists, device B can create a new record for device A and populate it with this information.

Device B may provide device A with information including its SSH client public key, an enable password and, optionally, various username/password combinations to prevent unauthorized access to device A from its local front panel, other consoles or its various input/output ports. Device A updates its configuration records with this information. Importantly, once device A accepts this configuration information it becomes subjugated to device B and only device B will be able to communicate with device A using the SSH keys exchanged during this initial exchange of information. Notice that if username/passwords known only to device B are set for device A's front panel, etc., then device B establishes complete administrative control over device A. For example, because the necessary information to access device A's front panel or other control interfaces are known only to device B, an attacker cannot use device A's local setup interfaces to wrest control device A away from device B before device B has a chance to establish the desired configuration information on device A.

Notice that the method depicted in FIG. 2 does not require the installer of device A to know any shared secrets or passwords. Device B authenticates itself to device A and vice-versa. As part of this exchange, SSH keys for use during later communications are exchanged and stored on each respective device. These keys allow later communications between device A and device B to be carried out using secure communication protocols so as not to expose the information being exchanged to other devices (or eavesdroppers) in the communication path between device A and device B.

In some cases, once device B has authenticated device A and device A has obtained network configuration data from device B, device A may communicate directly with the other computer systems that make up the network without the need for any intervention by device B. In other instances, device B may closely manage operation of device A and determine the permissions of device A according to a configuration plan created or installed by a network administrator. All communications between device A and the network may pass through device B. Device B may thus act as a management node that has administrative control of device A and manage the operation of device A. Regardless, the present methods ensure that device A is properly identified and configured before it begins operation in the network.

Where used, the CRL may be provided from a certificate authority to device B periodically. This obviates the need for device B to contact the certificate authority every time it needs to authenticate another device being added to the network. Alternatively, device B may communicate with a certificate authority each time it receives a certificate from a new device, to determine whether that certificate has been revoked.

In various embodiments of the invention, device B may maintain a list of devices that are allowed to join the network. Such a list may be compiled by a network administrator and updated periodically. The list may identify authorized devices by specific identifying criteria (such as serial numbers), or more generally, by type, functionality, manufacturer's identity, or other attributes. Device B may consult this list when authenticating a device seeking access to the network.

Similarly, device B may maintain a list of permissions for each device that is allowed to join the network. This list may govern the permissions granted to each device (such as device A in the above examples) as it joins the network and may be incorporated into the network information sent to such device once it is authenticated and allowed to join the network. Appropriate permissions from the list for each respective device may be identified through the use of the unique identifier presented by that device when it joins the network. Alternatively, the permissions may be included with the certificate presented by device A to device B and simply verified as being accurate or accepted by device B during the authentication process.

In some cases, device B is coupled to a network such as the Internet and obtains device information concerning device A from other nodes communicatively coupled to that network. For example, device B may obtain information concerning device A or the configuration of device A from a server accessible via the Internet. As above, the appropriate information for the subject device may be identified using the unique identifier presented by that device.

Thus, systems and methods for authentication of computer-based devices have been described. Of course, other modifications and variations of the invention are possible without departing from the scope of the invention and will be apparent to those having read the foregoing description. For example, although the present invention has been discussed in the context of a two-way authentication process, a one-way authentication process may be suitable in certain instances. In such cases, only one of device A or device B may be configured to authenticate the other device. Such a process may be used where the authenticity of the non-authenticated device can be assured; for example where the network is inaccessible to non-authorized devices. Hence, the present invention should not be limited to the above-described example, but instead measured in accordance with the claims.

What is claimed is:

1. A computer-implemented method, comprising:
   a first device seeking to join a computer network and a management node for the computer network mutually authenticating each other through an exchange of identification information, the identification information comprising digital certificates for each of the first device and the management node; and
   upon successful mutual authentication between the management node and the first device, providing, from the management node to the first device, configuration information for the first device to prohibit access to the first device by entities other than the management node, the first device having a local panel and the configuration information including at least a combination of a username and a password required to access the first device from the local panel of the first device, thereby preventing unauthorized access to the first device from its local front panel.

2. The method of claim 1, further comprising, prior to the first device and the management node mutually authentically each other, providing the first device with sufficient information to contact the management node.

3. The method of claim 2, wherein the sufficient information comprises a network address and a unique identifier for the management node.

4. The method of claim 3, wherein the unique identifier for the management node comprises a serial number.

5. The method of claim 3, wherein the network address and the unique identifier for the management node are provided via a communication path other than the computer network.

6. The method of claim 5, wherein the communication path comprises a wireless network.

7. The method of claim 5, wherein the communication path comprises a local configuration interface for the first device.

8. The method of claim 5, wherein the communication path comprises a memory device coupled to the first device.

9. The method of claim 1, further comprising exchanging, between the management node and the first device, respective SSH public keys for the management node and the first device following the successful mutual authentication.

10. The method of claim 1, further comprising updating, at the management node, a device record for the first device based on information received from the first device following the successful mutual authentication.

11. The method of claim 10, wherein the device record for the first device is identified based on a unique identifier received from the first device.

12. The method of claim 1, wherein the configuration information for the first device is identified based on a unique identifier presented by the first device during the mutual authentication process.

13. A computer-implemented method, comprising:
   exchanging, as part of an automated authentication process, respective SSH public keys for a first and second computer-based device, and providing configuration information from the second device to the first device sufficient to subjugate the first device to administration by the second device and to prohibit unauthorized access to the subjugated first device, the subjugated first device having a local panel and the configuration information including at least a combination of a username and a password required to access the subjugated first device from the local panel of the subjugated first device, thereby preventing unauthorized access to the first device from its local front panel.

14. The method of claim 13, wherein the automated authentication process includes an exchange of digital certificates between the first and second devices.

* * * * *